United States Patent
Weller

(10) Patent No.: US 6,966,561 B2
(45) Date of Patent: Nov. 22, 2005

(54) SPACER ELEMENT FOR A COLLET CHUCK AND COLLET CHUCK

(75) Inventor: Hans-Michael Weller, Marbach (DE)

(73) Assignee: Hainbuch GmbH Spannende Technik, Marbach (DE)

( * ) Notice: Subject to any disclaimer, the term of this patent is extended or adjusted under 35 U.S.C. 154(b) by 26 days.

(21) Appl. No.: 10/484,939

(22) PCT Filed: Jul. 20, 2002

(86) PCT No.: PCT/EP02/08105
§ 371 (c)(1),
(2), (4) Date: Jun. 18, 2004

(87) PCT Pub. No.: WO03/011503
PCT Pub. Date: Feb. 13, 2003

(65) Prior Publication Data
US 2004/0239054 A1 Dec. 2, 2004

(30) Foreign Application Priority Data
Jul. 27, 2001 (DE) .......................... 101 38 330

(51) Int. Cl.$^7$ .............................................. B23B 31/20
(52) U.S. Cl. ..................................... 279/43.7; 279/46.7
(58) Field of Search ............................... 279/43.7, 43.8, 279/46.7, 46.8

(56) References Cited

U.S. PATENT DOCUMENTS

| | | | | |
|---|---|---|---|---|
| 2,346,706 A | * | 4/1944 | Stoner ........................ | 279/46.7 |
| 3,539,193 A | * | 11/1970 | Parsons ........................ | 279/51 |
| 4,309,041 A | * | 1/1982 | Peterson et al. ........... | 279/46.7 |
| 4,858,938 A | | 8/1989 | Terwilliger | |
| 5,096,213 A | * | 3/1992 | Terwilliger et al. ........... | 279/51 |
| 5,865,073 A | * | 2/1999 | Wilson et al. ............. | 81/57.33 |

FOREIGN PATENT DOCUMENTS

| | | |
|---|---|---|
| DE | 1 085 008 B | 7/1960 |
| FR | 2 517 576 A | 6/1983 |

* cited by examiner

*Primary Examiner*—Derris H. Banks
*Assistant Examiner*—Ali Abdelwahed
(74) *Attorney, Agent, or Firm*—Akerman Senterfitt

(57) ABSTRACT

Collet chucks (20) comprise at least two tensioning segments (21). Adjacent tensioning segments are connected to each other by way of elastic spacer elements (30). The tensioning segments (21) have back-cuts (22), whilst the spacer elements have correspondingly formed sections (36). A positive fit of the formed sections in the back-cuts of the tensioning segments (21) is thus possible.

15 Claims, 5 Drawing Sheets

SPACER ELEMENT FOR A COLLET CHUCK AND COLLET CHUCK

FIELD OF APPLICATION AND PRIOR ART

The present invention relates to a spacer element for a collet chuck according to the preamble of claim 1 and to a collet chuck, such as is in particular used for chucking workpieces.

Collet chucks comprise several cooperating gripping or clamping segments, which are displaceable relative to one another in order to e.g. firmly hold work-pieces of different size, force and/or shape.

Such connections between clamping segments are e.g. brought about by corresponding elastic spacer elements, which interconnect the clamping segments. These elastomeric spacer elements can be positively held in the clamping segments and for this purpose the latter have corresponding undercuts.

Such elastomeric spacer elements in association with collet chucks are e.g. known from U.S. Pat. No. 4,858,938. The elastomeric material spacer elements are inserted loose in corresponding undercuts and recesses of the clamping segments. Due to the fact that the elastic spacer elements do not have a significant connecting or joining force, in the unassembled state of the clamping chuck there is a danger that e.g. during transportation thereof the cohesion between the clamping segments is lost. Such a loose connection is desirable because for wear reasons an easy replacement of the spacer elements is to be made possible. However, due to the loose cohesion and loss of cohesion between the clamping segments during transportation, the collet chuck has to be reassembled prior to each use, which involves unnecessarily high setting-up costs. In the case of large, heavy chucks, an injury risk for the operator can arise due to the not always adequate cohesion due to the loss of the connection between the clamping segments.

PROBLEM AND SOLUTION

Therefore the problem of the invention is to provide a spacer element and a collet chuck with a connection between the clamping segments of a collet chuck, the connection being on the one hand easily releasable for detaching the spacer elements between the connecting pieces and on the other the collet chuck can be easily assembled and also in the unclamped state thereof offers a reliable hold.

This problem is solved by a spacer element with a collet chuck having the features of claim 1 and a collet chuck having the features of claim 9. Preferred and advantageous developments of the invention form the subject matter of further claims and are explained in greater detail hereinafter. By express reference the wording of the claims is made into part of the content of the description.

For the positive connection of two adjacent clamping segments of a collet chuck on two facing sides of a connecting segment, a spacer element according to the invention has shaped sections. The spacer element is made from flexible or elastomeric material. The shaped sections have in each case at least one opening or recess for the introduction of in each case one widening component or element, e.g. an expanding mandrel. As a result the shaped section can be widened or expanded.

According to a further extending development sliding faces are provided on the recesses. The sliding faces are in particular formed in the contact area between the expanding mandrel and the recess. The sliding faces are preferably made from non-elastomeric material and are in particular metallic. The sliding faces can be fixed in the vicinity of the recesses to the spacer elements in a non-detachable manner, e.g. by bonding or vulcanizing or injection moulding on.

In a preferred development of the invention the sliding faces are constructed in the form of a cohesive and advantageously one-piece intermediate piece. The intermediate piece can be constructed as a cross-sectionally round or elliptical and in particular circular tube. The tube can extend axially over the total length of the recess.

The intermediate piece advantageously has a slot extending over the axial length. The slot particularly runs linearly and axially over the total length of the intermediate piece. Alternatively the slot can be spirally coiled. The spiral coil can advantageously be constructed in such a way that over and beyond the axial length there is precisely one turn of the axial coil. This measure ensures that the intermediate piece can be readily expanded and deformed. In addition, over the total length of the recess considered at any point of the circumference, at least over a partial path, a supporting of the spacer element on the intermediate piece is ensured. This reliably avoids contact between the spacer element and the expanding mandrel when the latter is in the inoperative position.

According to a preferred embodiment of a spacer element, the latter is cross-sectionally bone-shaped. It has two thickened, rounded end regions, which form shaped sections. It also has a web formed between the shaped sections and constituting the connecting piece between them. Preferably each of the thickened end regions has a centrally positioned, preferably round or elliptical, particularly elongated hole-shaped or circular bore axially traversing the end region. There is preferably a tubular, axially supported intermediate piece on the insides of the bore.

A collet chuck according to the invention is particularly used for chucking workpieces. Such a collet chuck has at least two clamping segments. Adjacent clamping segments are interconnected by elastic spacer elements, which can be constructed in the manner described hereinbefore.

The clamping segments have undercuts, whilst the spacer elements have correspondingly shaped shaped sections, so that a positive engagement of the shaped sections of the spacer elements in the undercuts of the clamping segments is possible. According to the invention an expanding mandrel is provided, which can be inserted in the vicinity of the undercuts and which ensures a frictional connection between the clamping segment and spacer element. Thus, according to the invention, there is no longer only a positive, but also a frictional connection between the clamping segment and the spacer element. The frictional connection is limited to the area of the undercuts in the clamping segment.

Due to the fact that the frictional connection takes place by the introduction of the expanding mandrel in the vicinity of the undercuts, in addition to the positive connection between the spacer element and the clamping segment a frictional connection is obtained. This connection can be released in that the frictional connection is removed as soon as the expanding mandrel is taken away. In this case there is once again only a positive connection between the spacer element and the clamping segment. In this state the closer, which comprises spacer elements and clamping segments, can be easily assembled and disassembled. It is possible to individually replace without significant effort and expenditure fatigued or damaged spacer elements. Only as a result of the insertion of the expanding mandrels at the intended locations is the frictional connection produced, so that then a reliable and safe assembly state of the collet chuck is obtained.

According to an advantageous development of the invention a sliding face is provided between the expanding mandrel and the spacer element. The sliding face can be in the form of a one-piece intermediate piece. The sliding faces of the intermediate piece, along which the expanding mandrel moves during the insertion into the receptacle provided, are made from a non-elastomeric material. The function of the intermediate piece or the sliding faces formed on the spacer element is to ensure that the expanding mandrel can be introduced into the corresponding position without significant frictional resistance and without deformation or distortion of the spacer element. The sliding face or intermediate piece are in particular made from a metallic material, which has a low frictional resistance with respect to the expanding mandrel. An easily deformable metal, e.g. aluminium can be used. This has the advantage that such an intermediate piece is light and can also be easily deformed. This may e.g. be necessary in order to produce the frictional connection between spacer element and clamping segment.

According to a further extending development of the invention the expanding mandrel is held between the clamping segment and the spacer element in the vicinity of the undercut and produces a frictional connection between the clamping segment and spacer element. Alternatively the spacer element can have a recess into which the expanding mandrel can be introduced. Within the recess the expanding mandrel is completely surrounded by the spacer element. The recess in the spacer element is preferably formed in the area in which the expanding mandrel engages in the undercut of the clamping segment. According to a further extending development of the invention the frictional connection between the spacer element and the clamping segment can be brought about by elastic deformation of the recess. Such a construction can in particular be advantageous if the spacer element is bone-shaped. The rounded ends of the bone shape then engage in the undercuts of a clamping segment and between the rounded points there is a substantially rectangular connecting section. Each of the rounded each sections can have a recess.

The recess can be round and in particular oval, e.g. being preferably in the form of an elongated hole. Preferably the longer major axis of the rounding or oval passes in the direction of the connecting segment between the two round ends. Advantageously within the interior of the recess is placed a spacer element, which is made from a correspondingly shaped metal body having a through, axial slot. Into the interior of this metal body can be introduced the expanding mandrel, which has the shape of the recess. By rotating the expanding mandrel after the end of the introduction by an angle of 90ø, the rounded end of the bone-shaped end of the spacer element is deformed in such a way that there is a frictional connection between the spacer element and the clamping segment. The clamping segment has a recess corresponding to the outer contour of the bone-shaped spacer element and which is consequently approximately circular in cross-section and into which the spacer element can be introduced. The rotation of the expanding mandrel reduces the diameter of the elastomeric part of the spacer element between the recess and the clamping segment in the region of the greatest mandrel width. The frictional connection is produced in this section. The positive and frictional connection can in particular be ensured if the undercut of the clamping segment serving to receive the rounded end of the bone-shaped clamping segment has an outwardly directed opening, whose width is smaller than the longest axis of the expanding mandrel, i.e. the longest extension of the elongated hole-shaped recess.

Preferably, according to the invention, a spacer element is in each case placed between two adjacent clamping segments and the spacer element is positively and non-positively held in each of the two clamping segments.

In a particularly advantageous manner a collet chuck has a spacer element as described hereinbefore and which can have one or more of the aforementioned features.

These and further features can be gathered from the claims, description and drawings and the individual features, both singly and in the form of subcombinations, can be implemented in an embodiment of the invention and in other fields and can represent advantageous, independently protectable constructions for which protection is claimed here.

BRIEF DESCRIPTION OF THE DRAWINGS

Embodiments of the invention are described in greater detail hereinafter relative to the attached drawings, wherein show.

DETAILED DESCRIPTION OF THE EMBODIMENTS

Figure 1:
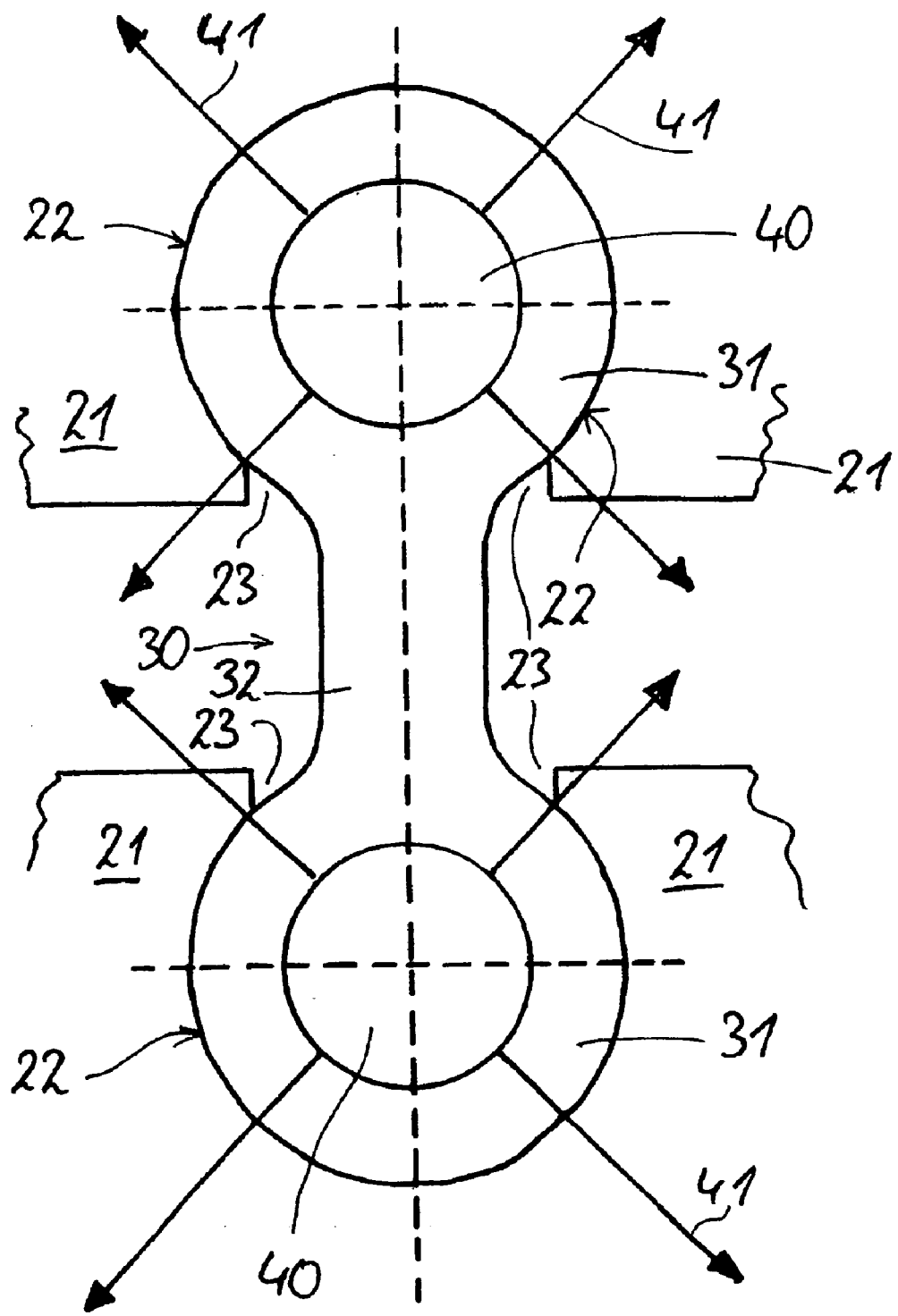
FIG. 1 A cross-sectional, diagrammatic representation of an inventive positive and frictional connection between the two clamping segments of a collet chuck by means of a bone-shaped spacer element.

FIG. 1 shows in plan view two gripping or clamping segments 21 of a collet chuck 20. Each of these clamping segments has an undercut 22. The undercut can be either axial or radial to the major axis of a collet chuck 20. The embodiment shown in this drawing and the other drawings are essentially independent of whether the clamping segments 21 with the spacer elements 30 are aligned axially or radially relative to the major axis of the collet chuck 20. In the embodiment shown the undercut 22 is in the form of a cylindrical recess extending along its cylinder axis, which is in plan view perpendicular to the drawing plane. As stated, it is unimportant whether the extension axis of the undercut is axial, i.e. parallel to the major axis of the collet chuck 20, or radial thereto.

The spacer element 30 is positioned between the two clamping segments 21. The spacer element 30 comprises two thickened end regions and a connecting piece 32 linking said regions. The outer contour of the thickened end regions 31 is shaped in such a way that it can be inserted in the undercut 22 of the clamping segments 21 and at least partly positively engages thereon. Each of the undercuts 22 of the clamping segments 21 has an opening 23 towards the outside of said segment 21. In the vicinity of said opening 23 extends the connecting piece 32 of the spacer element 30 and which interconnects the finished end regions 31. Thus, overall the spacer element 30 is bone-shaped. In plan view the connecting piece 32 is substantially parallelepipedic. The elasticity of the material of the connecting piece 32 essentially determines the elasticity and forces between the clamping segments 21 and therefore also the damping characteristics of the collet chuck 20. By means of the material thickness and toughness of the material, especially of the spacer element 30, particularly in the vicinity of the connecting piece 32, but also in the transition area between the thickened end regions 31 and the connecting piece 32, the durability and toughness of the spacer element are determined. The spacer element is a wearing part which has to be regularly replaced.

In the thickened end region 31 and in particular centrally therein, the spacer element 30 has an axially directed bore 33 for receiving an expanding mandrel 40. The outer contour of the expanding mandrel 40 corresponds to the inner contour of the bore 33. However, the diameter of the expanding mandrel 40 has a certain oversize compared with the internal diameter of the bore 33 of the spacer element 30. The amount of said oversize is determined as a function of the material characteristics of the spacer element 30 and the deforming forces to be applied, as well as the forces to be applied for producing the frictional connection. The arrows 41 indicate that the forces arising as a result of the different diameter and which act from the expanding mandrel on the spacer element apply a holding force throughout the area where the spacer element engages positively on the undercut 22. Thus, following the insertion of the expanding mandrel a mechanically reliable holding of the material is ensured.

Figure 2:
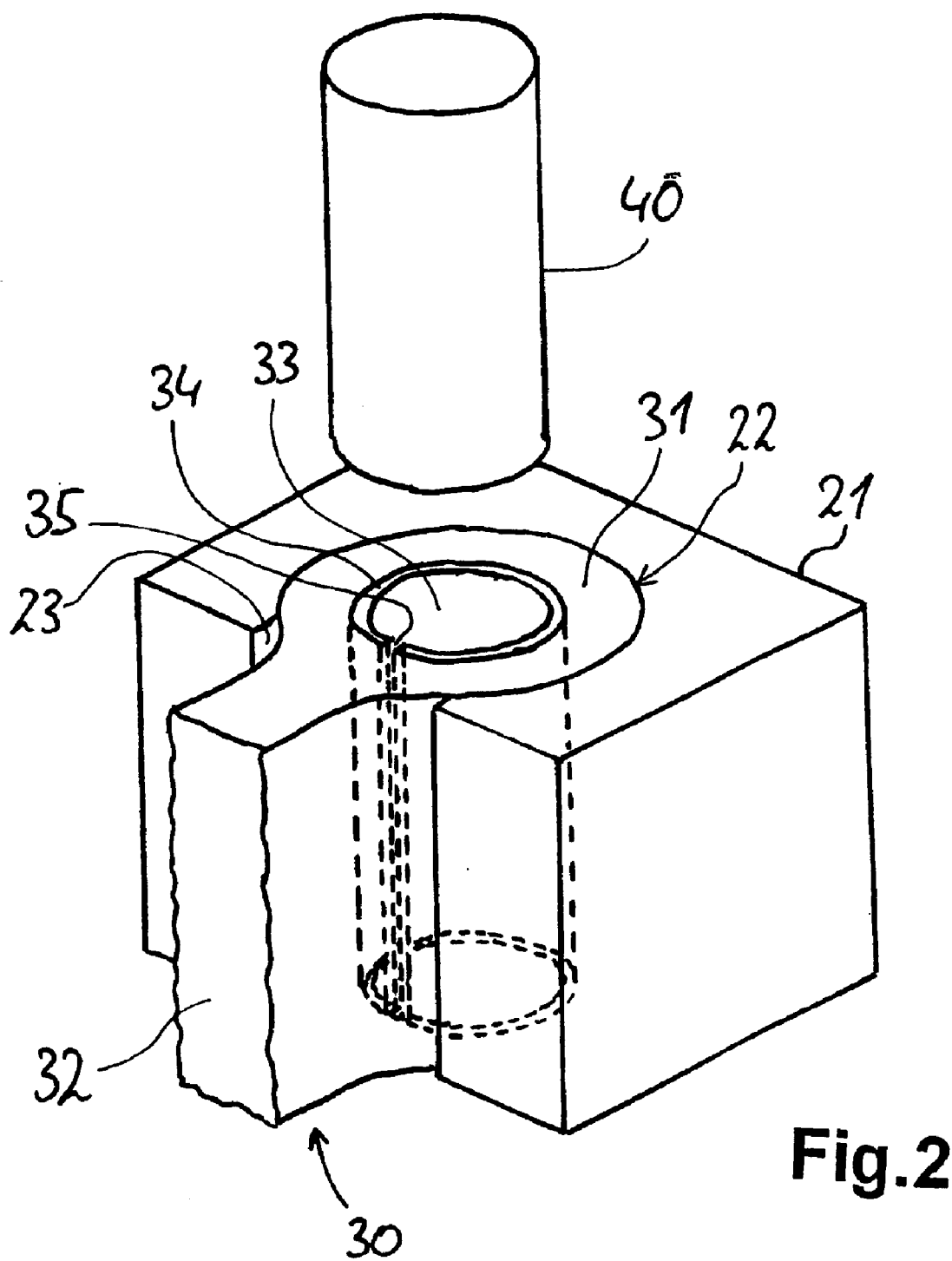
FIG. 2 A diagrammatic ghosted view of the positive and frictional connection between a clamping segment and a spacer element by means of an expanding mandrel insertable in a recess according to a first embodiment.

Substantially corresponding to FIG. 1, FIG. 2 is a perspective view of a clamping segment 22 cooperating with a spacer element.

The clamping segment 21 has an undercut 22 into which is introduced the spacer element 30. The spacer element 30 is centrally provided in the thickened end region 31 positively engaging on the undercut 22 with a bore 33, which axially traverses the spacer element 30. The axis of the bore 33 is oriented substantially parallel to the centre axis of the undercut and passes centrally in the said undercut 22. An intermediate piece 34 is placed in the spacer element 30 in the vicinity of the hole. The intermediate piece 34 extends axially over the entire length of the spacer element 30. Also radially the intermediate piece 34 is interrupted by an axially directed, narrow slot 35. This slot 35 can be constructed in such a way that it passes through the entire axial length of the intermediate piece. However, it is also possible to have a different slot configuration, e.g. an axially coiled, spiral path, as well as a serrated slot shape, in which the teeth or serrations alternately project from both sides over the centre. Thus, in axial view, over the entire circumferential distance at at least one point or at least over part of the axial length of the spacer element is provided a portion of the intermediate piece. The intermediate piece serves as a sliding element or bearing between the expanding mandrel 40 and spacer element 30 in order to reduce the friction, which would be very high particularly with elastomeric material or rubber. The intermediate piece is firmly connected to the remaining spacer element 30, e.g. by vulcanization or bonding. The intermediate piece is preferably made from a metallic material, e.g. thin aluminium.

The expanding mandrel 40 has an external diameter larger than the initial internal diameter of the spacer element 30, i.e. the internal diameter of the tubular intermediate piece 34. In order to ensure good insertability of the expanding mandrel 40, it can be constructed in such a way that it conically widens. The front end of the expanding mandrel 40, which would be introduced first into the interior of the bore 33, would consequently have a smaller external diameter than the internal diameter of the bore 33 in the outer region facing the expanding mandrel 40.

In order to still ensure an engagement of the expanding mandrel 40 over the entire length of the bore 33, it is possible for the bore to conically taper over its axial length. To still ensure a uniform seating of the spacer element over the entire axial extension in the clamping segment 21 and so as not to change the spring tensions through a thickening spacer element material layer, it is also possible for both the bore 33 and the spacer element 30 to conically taper. In order to achieve a corresponding positive engagement of the spacer element 30 in the vicinity of the undercut 22 of the clamping segment 21, said undercut 22 need not be cylindrical, but can also taper, e.g. conically over the axial length. However, in the inserted end position of the expanding mandrel 40 the external diameter thereof at all points exceeds the original internal width of the bore 33 and consequently the intermediate piece 34 at this point.

Through the introduction of the expanding mandrel into the spacer element the positive connection between the spacer element and the clamping segment 21 is supplemented by an additional frictional connection.

Figure 3:
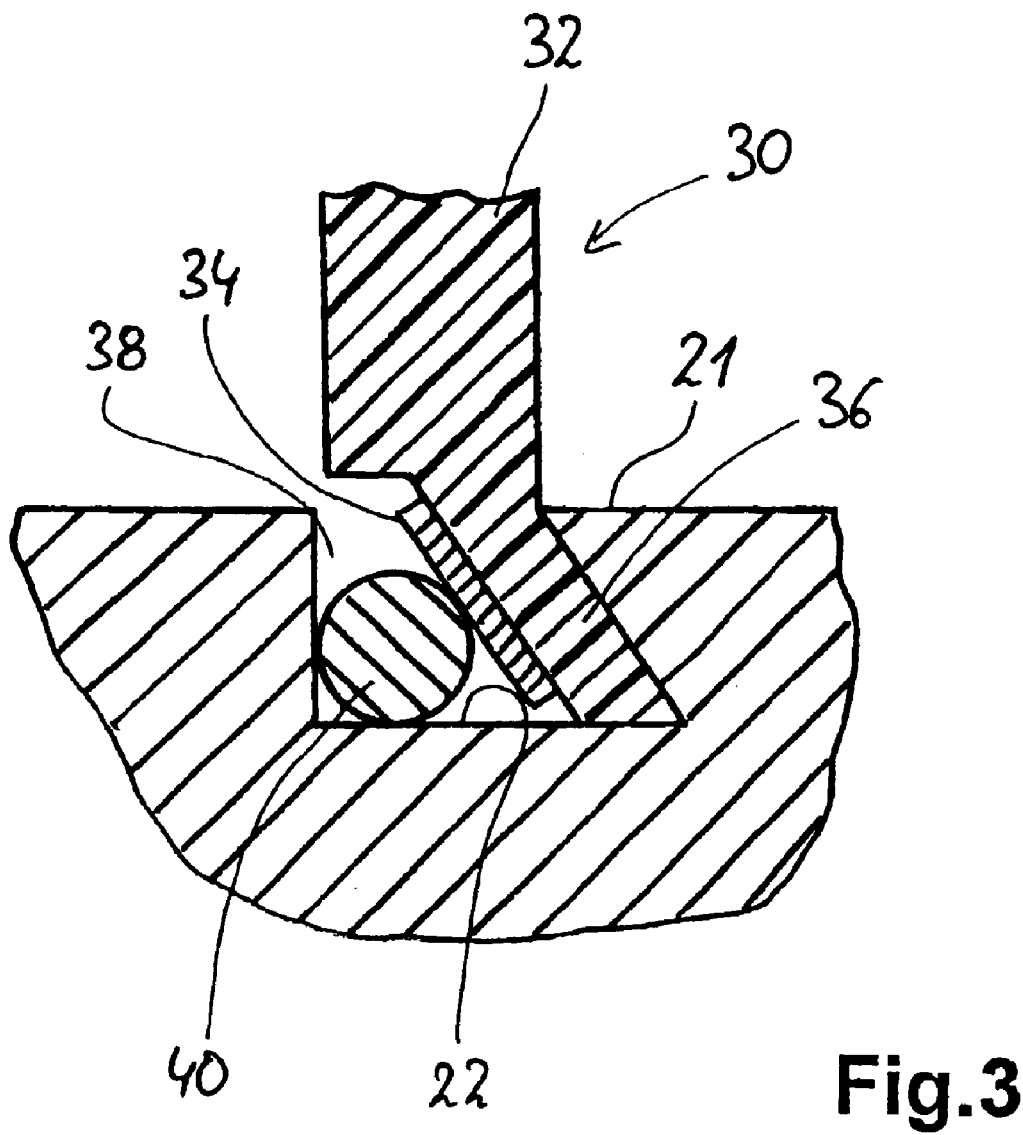
FIG. 3 A second embodiment of a positive and frictional connection between clamping segment and spacer element.

FIG. 3 shows another embodiment of a positive and non-positive connection between a spacer element 30 and a clamping segment 21. The clamping segment 21 has a groove-like undercut 22, at least one of the sides of the groove being bevelled in such a way that in the base of the groove there is a greater width than on the upper groove edge. The spacer element 30 comprises a connecting section 32, which extends at least approximately to the upper groove edge and which is formed by the outer contour 24 of the clamping segment 21. The connecting piece 32 is parallelepipedic. The spacer element 30 then has a shaped section 36, which is parallel to the groove side slope and therefore engages positively on the sloping groove area. On the inside of the shaped section 36 remote from the slope is undetachably fixed a sliding face 34, e.g. made from a metallic material. In the vicinity of said sliding face 34, the spacer element 30 has a recess 38, so that the spacer element 30 at least fails to fill part of the groove area and into the recess 38 can be introduced an expanding mandrel 40. In the embodiment shown the expanding mandrel 40 engages along two sides, namely along the unbevelled groove sides, on the clamping segment 21. As a result of its correspondingly large external diameter over the sliding face 34, it presses the material of the shaped section 36 against the bevelled side of the groove. Thus, here there is not only a positive, but also a frictional connection between the spacer element 30 and the clamping segment 21. According to alternative developments it would be possible for the recess 38 to only be substantially triangular and to have on the unbevelled groove side part of the shaped section 36 of the elastomeric material of the spacer element 30, which can also have a sliding face on its inside. Thus, the expanding mandrel 40 engages on two sides on the spacer element 30 and on the clamping segment 21 only towards the groove base.

Figure 4:
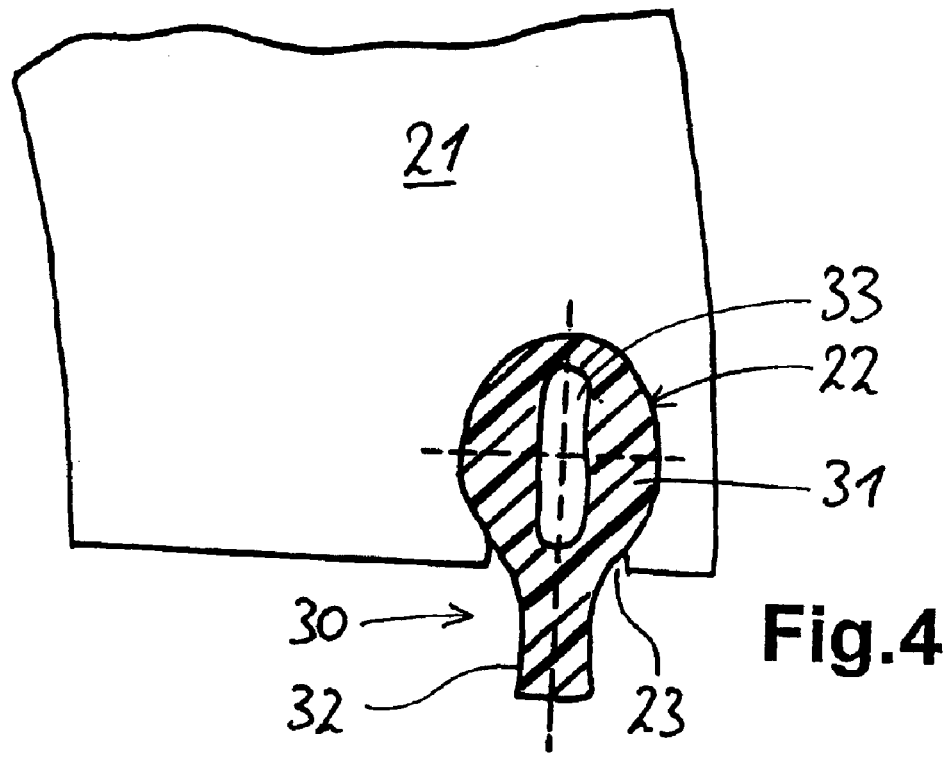
FIGS. 4 & 5 A third embodiment of a positive and frictional connection between clamping segment and spacer element in the released intermediate position and fixing end position.
Figure 5:
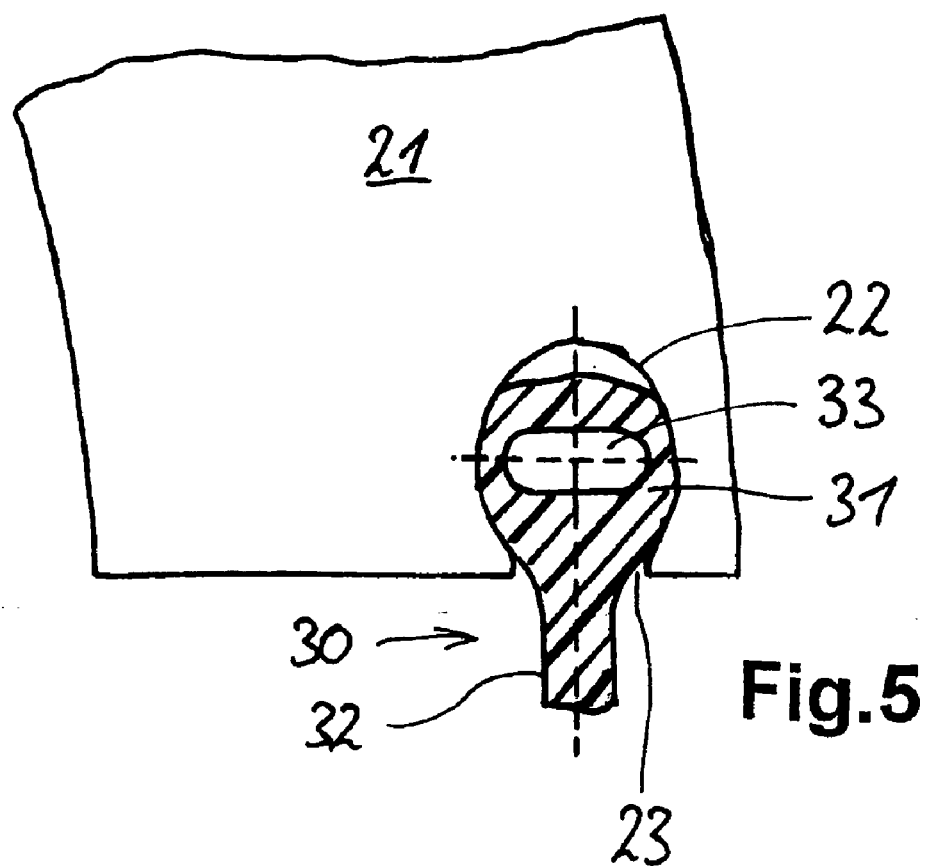

FIG. 4 shows another embodiment of an inventive positive and non-positive connection. FIG. 4 shows the situation where there is only a positive connection between the spacer element 30 and the clamping segment 21. FIG. 5 also shows the frictional connection.

FIG. 4 shows a spacer element 30 with a thickened end region 31 and an intermediate piece 32, which is only shown in part sectional form and at whose other end is again connected a thickened end region 31. The clamping segment 21 has an undercut 22, which is substantially oval. The undercut can also be elongated hole-shaped. However, the oval, substantially elliptical shape with its two spaced focal points represents an appropriate construction. The connecting line between the two focal points preferably defines a first centre symmetry plane, which is also continued in the vicinity of the connecting piece 32. A second axis of symmetry perpendicular thereto between the two focal points of the elliptical shape also defines a mirror symmetry axis with respect to the shape of the thickened end region.

An elongated hole-shaped bore 33 is formed in each thickened end region 31 of the spacer element 30. The elongated hole-shaped bore has a length which is smaller than the shorter major axis of the elliptical undercut 22. The centre of the elongated hole-shaped bore is preferably central with respect to the undercut 22 and with respect to the centre of the thickened end region 31. An expanding mandrel 40, e.g. according to FIG. 2, can be inserted in the bore 33. However, it must be borne in mind that there must be a specific orientation of the expanding mandrel, which has an elongated hole-shape in accordance with the elongated hole-shaped construction of the bore 33. For graphic simplification purposes the expanding mandrel 40 is not shown in FIGS. 4 and 5.

In accordance with the description regarding FIG. 2 it is also possible to have a conical taper of the elongated hole over the entire axial extension thereof. Once again in accordance with the description of FIG. 2, the greatest width of the cone is on the upper outside and in the case of a radial arrangement of the spacer element, on the radially outer point and with an axial alignment of the spacer element on the front of the collet chuck.

By rotating the expanding mandrel 40 introduced into the bore 33 of the spacer element 30, there is now a passage from the situation in the left-hand half to that in the right-hand half of the drawing. Through elastic deformation of the material of the spacer element 30, the alignment of the elongated hole is initially forcibly changed. As the spacing between the edge of the undercut 22 and the start of the expanding mandrel 40, considered in the width direction, reduces in the thickening area, as a result of this elastic deformation and the change to the alignment of the elongated hole, a frictional connection is produced between the spacer element 30 and undercut 22. The situation is preferably such that the elongated hole 33 is longer than the width of the opening 23 of the undercut 22. Thus, only if the spacer element material is torn, can the spacer element 30 be removed from the undercut. However, here there is also a clamping holding of the material between the expanding mandrel 40 and the edge of the undercut. Thus, this process can only take place on releasing the frictional connection.

Figure 6:
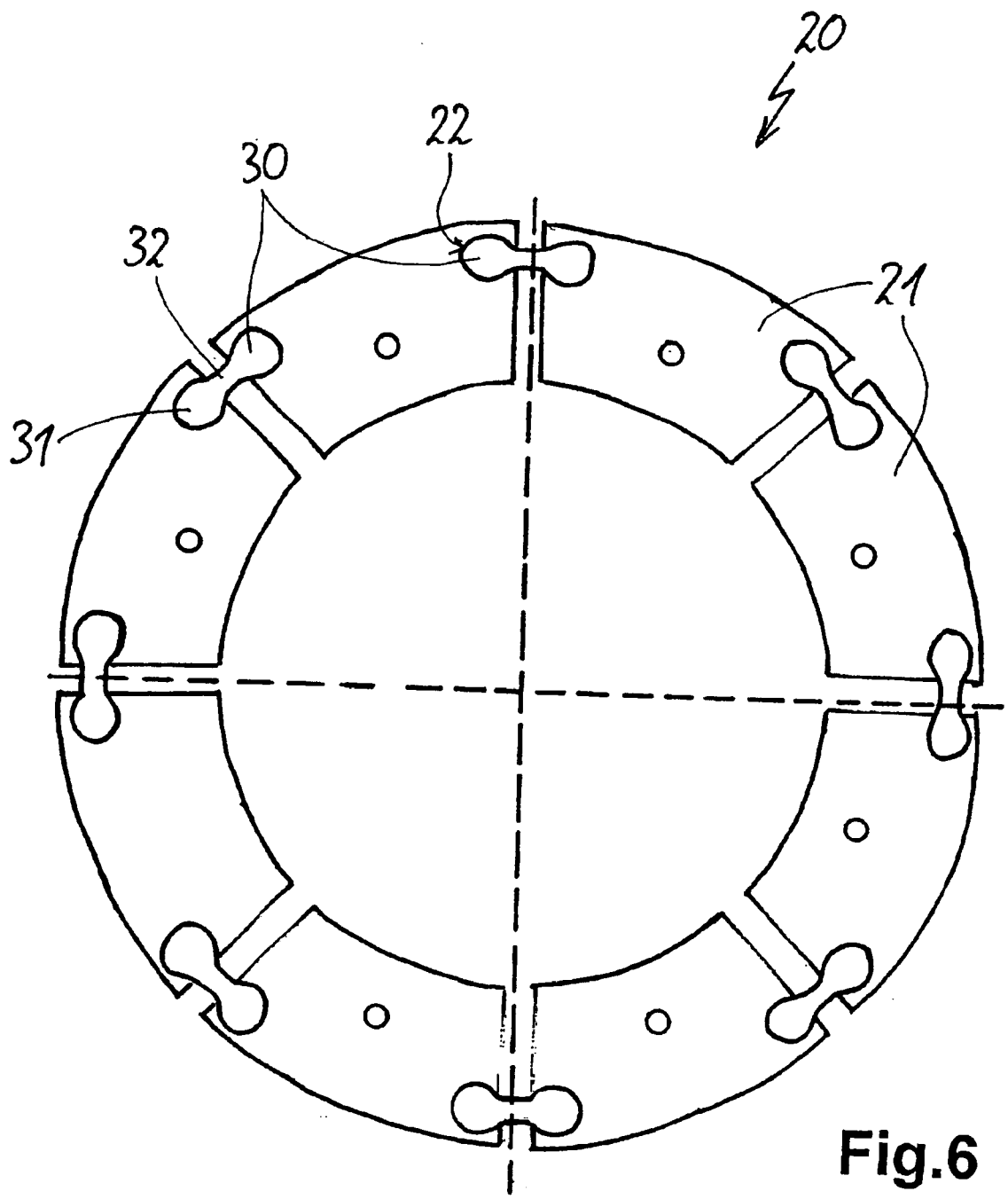
FIG. 6 A front view of a collet chuck with several clamping segments, adjacent clamping segments being in each case interconnected via a spacer element.

In a diagrammatic plan view FIG. 6 shows a collet chuck 20 constituted by in all eight clamping segments 21, a spacer element 30 being placed between every two clamping segments. Thus, there are in all eight spacer elements 30. According to the drawing use is made of spacer elements of the type shown in FIGS. 4 and 5. However, it is possible to use any other spacer element form or shape, particularly one of those described hereinbefore.

What is claimed is:

1. Spacer element for the positive connection of two adjacent clamping segments of a collet chuck, with shaped sections formed on facing sides of a connecting segment, the spacer element being made from elastomeric material, characterized in that the shaped sections in each case have at least one recess for the introduction of in each case one widening element, particularly an expanding mandrel.

2. Spacer element according to claim 1, characterized in that sliding faces are provided at the recesses.

3. Spacer element according to claim 2, characterized in that the sliding faces are provided in a contact area to the expanding mandrel.

4. Spacer element according to claim 2, characterized in that the sliding faces are made from non-elastomeric, preferably metallic material.

5. Spacer element according to one of the claim 2, characterized in that the sliding faces are non-detachably fixed and in particular bonded or vulcanized to the spacer element in the vicinity of the recesses.

6. Spacer element according to claim 2, characterized in that the sliding faces are constructed as a cohesive, one-piece intermediate piece.

7. Spacer element according to claim 6, characterized in that the intermediate piece is constructed as a cross-sectionally elliptical, particularly circular tube, which has a slot extending in the axial direction and preferably the slot is spirally coiled over the tube length.

8. Spacer element according to claim 6, characterized in that the spacer element is cross-sectionally bone-shaped, thickened end regions forming the shaped sections, a web between the shaped sections forming the connecting segment, each thickened end region having a centrally positioned bore, which is elliptical, particularly elongated hole-shaped or circular and which axially traverses the end region and on the inside thereof is located a tubular, axially slotted intermediate piece.

9. Collet chuck, particularly for chucking workpieces, with at least two clamping segments, in which:
adjacent clamping segments are interconnected by elastic spacer elements,
undercuts are formed on the clamping segments,
the spacer elements have shaped sections for positive engagement in the undercuts of the clamping segments,
characterized in that a widening element is provided and is insertable in the vicinity of the undercuts and the widening element produces a frictional connection between at least one clamping segment and at least one spacer element.

10. Collet chuck according to claim 9, characterized in that the widening element is constructed as an expanding mandrel and between the expanding mandrel and spacer element are provided sliding faces, particularly in the form of a one-piece intermediate piece and preferably the sliding faces are made from non-elastomeric material.

11. Collet chuck according to claim 9, characterized in that the expanding mandrel is held in the vicinity of the undercut between the clamping segment and spacer element and produces a frictional connection between clamping segment and spacer element.

12. Collet chuck according to one of the claim 10, characterized in that the spacer element has a recess, into which the expanding mandrel can be introduced and in the recess is completely embraced by the spacer element.

13. Collet chuck according to claim 11, characterized in that the frictional connection by means of the expanding mandrel is produced by elastic deformation.

14. Collet chuck according to claim 9, characterized in that in each case between two adjacent clamping segments is provided a spacer element, which is positively and non-positively held in each of the two clamping segments.

15. Collet chuck according to claim 9, characterized in that it has a spacer element according to claim 1.

* * * * *